Patented Apr. 5, 1938

2,112,931

UNITED STATES PATENT OFFICE 2,112,931

CATALYTIC MATERIAL AND METHOD OF PRODUCING SAME

Walter A. Schulze, Bartlesville, Okla., assignor to Phillips Petroleum Company, a corporation of Delaware No Drawing. Application October 6, 1936, Serial No. 104,305

6 Claims. (Cl. 23—233)

The present invention relates to a catalytic material adapted more particularly to facilitate the decomposition of organic sulfur compounds and to improve the antiknock characteristics of those hydrocarbon fluids utilized as motor fuels.

More specifically, the invention relates to an extremely porous aluminum oxide and to the process of manufacture of such catalytic material.

It has been known heretofore that when sulfur bearing hydrocarbon vapors are passed over alumina in certain of its naturally occurring forms, e. g. bauxite, some of the organic sulfur compounds are decomposed to hydrogen sulfide. I have found moreover that commercial aluminas when used for this purpose are frequently much less effective catalysts than the naturally occurring bauxites. I attribute this difference to the physical and chemical structure of these materials. It is fairly definitely established that among naturally occurring hydrated aluminas gibbsite (or hydrargillite) and diaspore are respectively $Al_2O_3.3H_2O$ and $Al_2O_3.H_2O$. The composition of bauxite is still doubtful. Likewise, the crystalline commercial precipitate obtained from solutions of alumina in alkalies is a definite hydrate, $Al_2O_3.3H_2O$, either identical with gibbsite or isomeric with it. Certain authorities have concluded also that precipitated gelatinous alumina is composed of $Al_2O_3.3H_2O$, containing water adsorbed on its surface and entrained in its interstices. None of these forms of alumina appear to correspond to the improved alumina which I have discovered, the improvement undoubtedly lying in the peculiar structure as well as in the exceptionally high porosity of this new product.

It is the object of this invention to provide an improved alumina catalyst whose physical structure is such that the material has a considerably higher catalytic activity than those aluminas produced heretofore. In other words, the activity of the catalyst is so much improved that the rate of decomposition of organic sulfur compounds such as mercaptans and sulfides is so rapid that complete decomposition can be had at lower operating temperatures. Furthermore, certain classes of the so-called residual sulfur compounds are decomposed quite readily with my improved catalyst whereas such compounds are normally rather resistant to decomposition.

I have discovered that this improved alumina catalyst of extremely high porosity and low specific gravity can be made by making a suspension of finely divided carbon black in an aqueous solution of an aluminum salt such as the nitrate. An alkali, preferably ammonium hydroxide, is then added and the aluminum hydroxide is precipitated. The aluminum hydroxide gel is thoroughly impregnated with the finely divided particles of carbon black. In addition to this impregnation I believe there is still another effect, namely, the presence of the carbon black particles causes more rapid precipitation of the aluminum hydroxide when the alkali is added, thus producing a gel with a structure different from that produced heretofore in the absence of the finely divided carbon black.

The aluminum hydroxide-carbon black gel is filtered from the aqueous solution and washed with water to remove the alkali salt. It is then dried and ground and screened to a desirable sized product, usually 10 to 40 mesh. A stream of air or oxygen-containing gas is then passed over the said product while at an elevated temperature, so that the carbon black is oxidized and substantially removed. If desired, the carbon black may be removed prior to grinding and screening to proper size. The alumina catalyst is, of course, well dehydrated during this burning operation. The product prepared in this manner has a very low specific gravity, usually ranging from 0.25 to 0.65 but it may be more or less depending principally on the amount of carbon black used in the suspension. It has an extremely high porosity, yet it is not very friable whereas most catalytic materials of low specific gravity are friable.

A more specific example of one preparation of this improved alumina catalyst follows: One part by weight of aluminum chloride was dissolved in twenty parts by weight of water. One part by weight of carbon black passing a 300 mesh screen was stirred into the solution of aluminum chloride until a good suspension was had. An excess of dilute ammonium hydroxide was then added to precipitate aluminum hydroxide, the carbon black aiding in the formation of a very gelatinous precipitate. The precipitate was washed several times to remove the ammonium chloride and excess ammonium hydroxide. The product upon drying had a black, glossy, vitreous appearance. The carbon black was removed by passing a stream of carbon dioxide containing a small amount (5–10 per cent by volume) of oxygen through the product heated to about 500° C. The precipitate after the burning operation was white, porous and extremely light, its density being less than half that of bauxite or of most commercial aluminas.

The ratio of carbon black to aluminum salt can, of course, be varied over a wide range. I have obtained very satisfactory catalysts through the use of as little as one part of carbon black to ten or more parts of aluminum salt and likewise have secured excellent results from preparations wherein the carbon black was equivalent to or greater than the aluminum salt. It is evident that too high a proportion of carbon black will tend to increase the friability of the resultant alumina and render it unfit as a catalyst for vapor phase processes but within the limits stated herein excellent friability characteristics are had.

The carbon black referred to herein is that made from gaseous hydrocarbons but other blacks and similar materials can, of course, be used.

As an illustration of the activity of my alumina catalyst, the following examples are given. However, since the number of examples could be multiplied greatly, the ones given here are merely illustrative and in no sense limit the invention.

*Example 1*

Pentamethylene sulfide (a member of the thiophane series of sulfur compounds) in a light naphtha was vaporized and the vapors heated to a temperature of 705° F. While at this temperature the vapors were contacted with alumina catalyst prepared originally from sixteen parts of aluminum chloride to one part of carbon black at a flow rate equivalent to almost three liquid volumes of the naptha solution per hour per volume of catalyst. Much hydrogen sulfide was formed during the treatment; it was removed prior to further testing. The sulfur content of the solution prior to treatment was 0.0707 per cent and after the treatment 0.0025 per cent, indicating almost complete decomposition of the pentamethylene sulfide. Under similar conditions of flow rate and temperature, commercial aluminas and even bauxite were considerably less effective.

*Example 2*

Cracked gasoline produced by pressure cracking of Panhandle topped crude was given two successive treatments over highly active bauxite catalyst so as to remove all of the sulfur compounds which could possibly be attacked and decomposed by such catalysts. Following this treatment only the so-called residual sulfur compounds were present. The sulfur content was 0.0946 per cent.

This cracked gasoline stock was contacted in the vapor form with one of my alumina catalysts with a specific gravity of 0.4, prepared as indicated above, and at a temperature of 750° F. and a flow rate of about three liquid volumes per hour per volume of catalyst 16 per cent of the residual sulfur compounds were decomposed to hydrogen sulfide. The octane rating of the cracked gasoline was likewise considerably improved.

This same cracked gasoline stock was treated also at several higher temperatures with the other conditions remaining constant. At 872° F. the sulfur content was lowered 20.2 per cent, at 905° F. it was lowered by 24.8 per cent, and at 932° F. 30.2 per cent of the residual sulfur was removed. Further improvement in antiknock characteristics was noted at these higher temperature levels where more of the sulfur was removed.

The catalyst when poisoned by carbonaceous residues may be regenerated indefinitely by heat treatment with air or an oxygen-bearing gas.

In spite of the very high porosity this alumina catalyst shows unusually good mechanical strength, as is indicated by the low percentage of fines formed during either the handling of this catalyst or during the passage of gasoline stock vapors at high velocities and/or during regeneration.

This catalyst has many uses other than that of desulfurizing hydrocarbon fluids and of improving the antiknock characteristics of motor fuels. For example, it has specific advantages for facilitating the dehydration decomposition of organic substances and especially the dehydration of alcoholic bodies. Also, due to its highly porous character and high mechanical strength, it is especially suitable for impregnating with solutions of various materials, such as the metallic salts. Furthermore, it may be used with or without other substances for filtering purposes, or it may be used to dehydrate gases and vapors.

Mixed catalysts such as alumina and one or more of the various oxides may be prepared in a manner similar to the pure alumina mentioned above merely by starting with a solution containing the proper salts in the correct proportions and then adding the carbon black thereto.

It is obvious to those skilled in the art that various changes may be made in the composition and procedure as described and in the method of utilizing this improved alumina without departing from the scope of the invention as defined in the appended claims.

I claim as my invention:

1. A process of manufacturing highly porous alumina, which comprises, adding carbon black to a solution of an aluminum salt, adding an excess of an alkali whereby the aluminum salt is precipitated as aluminum hydroxide and the carbon black is incorporated in the precipitate, drying the precipitate of aluminum hydroxide and carbon black, removing the carbon black from the precipitate by oxidation, and thereby obtaining highly porous alumina.

2. A process of manufacturing highly porous alumina, which comprises, adding carbon black to a solution of an aluminum salt, adding ammonium hydroxide to the mixture whereby aluminum hydroxide is precipitated as a gel and the carbon black is incorporated in the gel, drying the gelatinous precipitate, and substantially removing the carbon black by oxidation with an oxygen-containing gas at elevated temperature.

3. A process of manufacturing an improved catalytic material for decomposing organic sulfur compounds and for improving the antiknock characteristics of motor fuels, which comprises, preparing a suspension of carbon black in a solution of an aluminum salt, adding ammonium hydroxide to the said carbon black suspension in the aluminum salt solution whereby a black gel comprising aluminum hydroxide and carbon black is formed, drying the said gel, substantially removing the carbon black by oxidation, and thereby obtaining an improved catalytic material.

4. A process of manufacturing highly porous alumina with a specific gravity within the range of 0.2 to 0.7 and with relatively high mechanical strength, which comprises, adding carbon black to a solution of an aluminum salt, adding an alkali to the mixture whereby a black gel comprising aluminum hydroxide and carbon black is formed, filtering the gel from the solution, washing the gel to remove the various impurities, drying the said purified gel, substantially removing the carbon black from the gel by oxidation at elevated temperature, and thereby obtaining a highly porous alumina with a specific gravity in the range of 0.2 to 0.7 and of relatively high mechanical strength.

5. A process of manufacturing a highly porous alumina for subsequent impregnation with metallic salt solutions, which comprises, adding carbon black to an aluminum salt solution, adding an alkali hydroxide to the mixture whereby a black gel comprising aluminum hydroxide and carbon black is formed, washing and drying said gel, and finally substantially removing the carbon black by oxidation.

6. A process of manufacturing a highly porous catalytic material comprising alumina, which comprises, adding carbon black to a salt solution comprising an aluminum compound, adding an alkali hydroxide to the mixture whereby a black gel is formed, drying said gel, and substantially removing the carbon black by oxidation.

WALTER A. SCHULZE.